United States Patent
Qiu

(10) Patent No.: US 12,468,340 B1
(45) Date of Patent: Nov. 11, 2025

(54) PROTECTION APPARATUS FOR WIRELESS POSITIONING DEVICE

(71) Applicant: HANGZHOU XIYANG E-COMMERCE CO., LTD, Zhejiang (CN)

(72) Inventor: Shanlin Qiu, Zhejiang (CN)

(73) Assignee: HANGZHOU XIYANG E-COMMERCE CO., LTD, Hangzhou (CN)

( * ) Notice: Subject to any disclaimer, the term of this patent is extended or adjusted under 35 U.S.C. 154(b) by 0 days.

(21) Appl. No.: 19/064,759

(22) Filed: Feb. 27, 2025

(30) Foreign Application Priority Data

Jan. 24, 2025 (CN) .......................... 202520171878.5

(51) Int. Cl.
*G06F 1/16* (2006.01)
*H04B 1/3888* (2015.01)

(52) U.S. Cl.
CPC ......... *G06F 1/1629* (2025.01); *H04B 1/3888* (2013.01)

(58) Field of Classification Search
CPC ............................ G06F 1/1629; H04B 1/3888
See application file for complete search history.

(56) References Cited

U.S. PATENT DOCUMENTS

| | | | |
|---|---|---|---|
| 7,877,909 B1* | 2/2011 | Hagen | G09F 3/14 63/23 |
| 2018/0236832 A1* | 8/2018 | Feng | B62D 25/209 |
| 2023/0092912 A1* | 3/2023 | Grice | G09F 3/20 340/573.3 |
| 2024/0254809 A1* | 8/2024 | Wright | F16M 13/04 |
| 2024/0306355 A1* | 9/2024 | Lin | H05K 1/02 |

* cited by examiner

*Primary Examiner* — Yuwen Pan
*Assistant Examiner* — Fatuma G Sherif

(57) ABSTRACT

Disclosed is a protection apparatus which includes: a first attachment element including a first base portion and a first attachment portion, the first attachment portion being provided at an edge of the first base portion, and the first attachment portion being provided with a first engagement body; a second attachment element including a second base portion and a second attachment portion, the second attachment portion being provided at an edge of the second base portion, the second attachment portion being provided with a second engagement body, and central axes of the first and second base portions coinciding with each other; and an internal space defined and formed between the first base portion and the second base portion for accommodating a wireless positioning device; the first and second base portions are screwed and locked together, with their attachment portions coinciding, ensuring the first and second engagement bodies align and engage.

17 Claims, 7 Drawing Sheets

PROTECTION APPARATUS FOR WIRELESS POSITIONING DEVICE

CROSS REFERENCE TO RELATED APPLICATIONS

The present disclosure claims priority of Chinese Patent Application No. 202520171878.5 filed on Jan. 24, 2025, the entire contents of which are hereby incorporated by reference.

TECHNICAL FIELD

The present disclosure relates to the technical field of tracking and positioning devices, and more particularly relates to a protection apparatus for wireless positioning device.

BACKGROUND ART

With the development of science and technology, wireless positioning devices such as Air Tag have been widely applied in the tracking of personal items, pets and even children. Generally, such devices are small in volume and convenient to carry, and may be fixed on backpacks, animals or children by users through key chains or ropes to achieve tracking and positioning functions at any time. However, although these wireless positioning devices have brought great convenience to people's lives, some problems demanding prompt solution are exposed in application processes of the wireless positioning devices. Due to small sizes of the wireless positioning devices themselves, additional protection housings are often required to firmly mount the wireless positioning devices on target objects in actual use. However, at present, the use requirements for the devices in complicated environments are not fully considered in the design of most protection housings on the market, such as collision, dropping and other situations which may be encountered during outdoor activities, thereby resulting in the risk of falling of the wireless positioning devices, and affecting the normal use experience of the users.

SUMMARY OF THE INVENTION

An embodiment of the present disclosure provides a protection apparatus for wireless positioning device which aims at solving the problem that an existing protection housing for a wireless positioning device has poor firmness in a complicated environment, so that there is a risk of falling of the wireless positioning device.

The present disclosure provides a protection apparatus for wireless positioning device, including:
  a first attachment element including a first base portion and a first attachment portion, the first attachment portion being provided at an edge of the first base portion, and the first attachment portion being provided with a first engagement body;
  a second attachment element including a second base portion and a second attachment portion, the second attachment portion being provided at an edge of the second base portion, the second attachment portion being provided with a second engagement body, and central axes of both the second base portion and the first base portion coinciding with each other; and
  an internal space defined and formed between the first base portion and the second base portion for accommodating a wireless positioning device;
  wherein the first base portion and the second base portion are screwed and locked with each other, and the first attachment portion and the second attachment portion coincide with each other, so that the first engagement body and the second engagement body are in aligned engagement.

The present disclosure provides a protection apparatus for wireless positioning device, and the protection apparatus for wireless positioning device includes: the first attachment element and the second attachment element, wherein the first attachment element includes the first base portion, the first attachment portion and the first engagement body, the second attachment element includes the second base portion, the second attachment portion and the second engagement body, the central axes of the first base portion and the second base portion coincide with each other, an internal space for accommodating the wireless positioning device is formed between the first base portion and the second base portion, the first base portion and the second base portion are screwed and locked with each other, and after locking, the first attachment portion and the second attachment portion coincide with each other, meanwhile the first engagement body and the second engagement body are in aligned engagement, so as to fasten the first attachment portion with the second attachment portion, so that the firmness of the whole apparatus is further increased, the apparatus is more steady and stable, and the structural strength is improved, thereby avoiding the risk of falling of the wireless positioning device in the face of the complicated environment, and improving the reliability of the wireless positioning device.

BRIEF DESCRIPTION OF THE DRAWINGS

In order to more clearly illustrate the technical solutions of the embodiments of the present disclosure, the accompanying drawings required to be used in the description of the embodiments will be briefly introduced below. It is apparent that the drawings in the following description are some embodiments of the present disclosure, and for a person of ordinary skill in the art, other drawings may also be obtained according to these drawings without involving any inventive effort.

Figure 1:
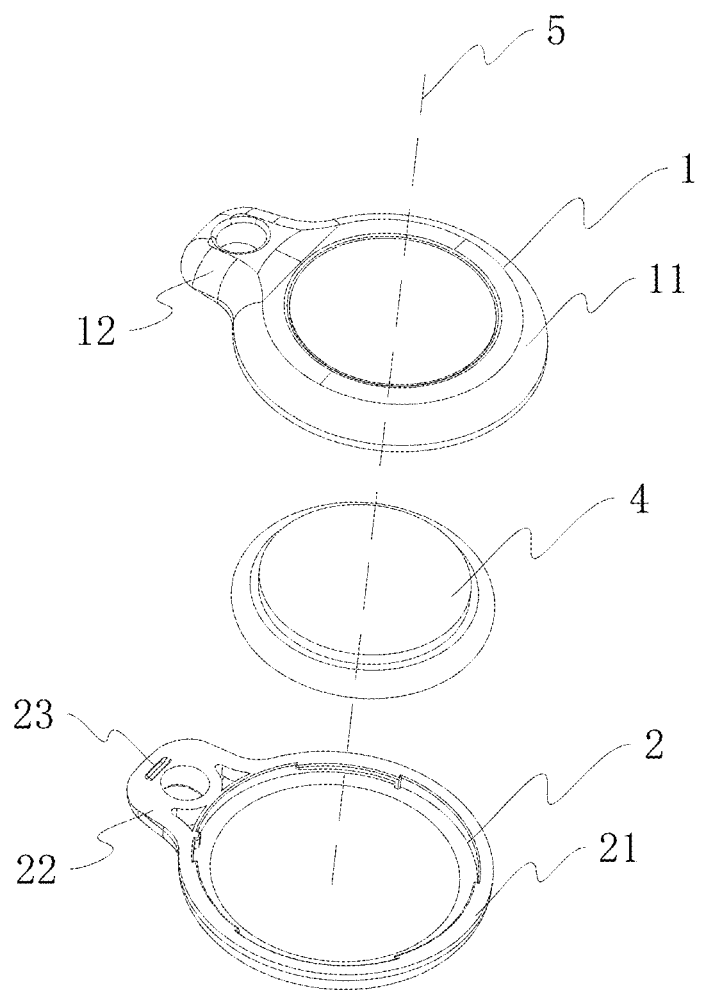
FIG. 1 shows a schematic exploded diagram of a protection apparatus for wireless positioning device according to an embodiment of the present disclosure.
Figure 2:
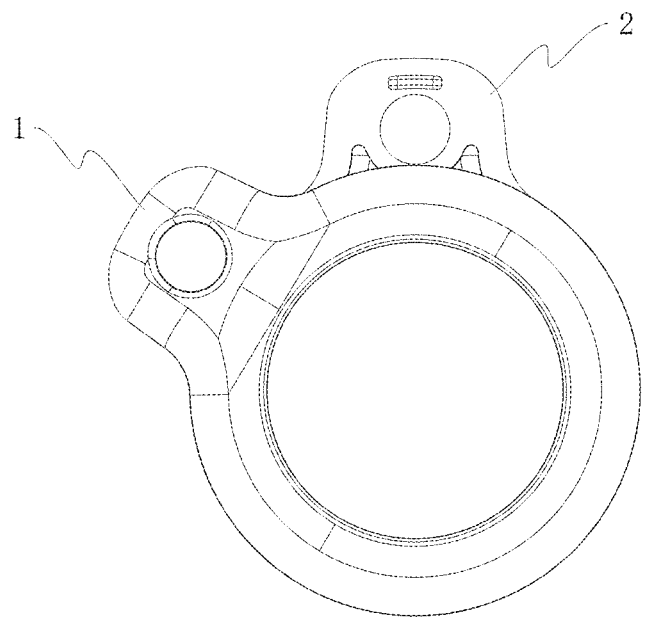
FIG. 2 shows a schematic diagram of the protection apparatus for wireless positioning device according to an embodiment of the present disclosure at an initial assembly position.
Figure 3:
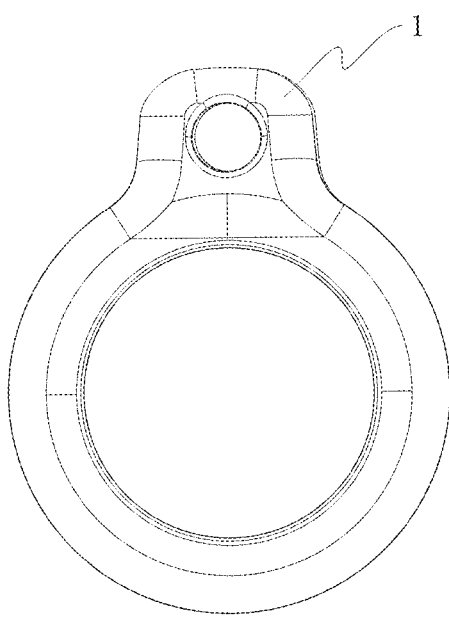
FIG. 3 shows a schematic diagram of the protection apparatus for wireless positioning device according to an embodiment of the present disclosure after being assembled.

REFERENCE NUMERALS 1. first attachment element; 11. first base portion; 111. window; 112. rotary male buckle; 12. first attachment portion; 121. first attachment through hole; 13. first engagement body; 131. first slope; 132. second slope; 14. cover body; 141. ultrasonic line; 2. second attachment element; 21. second base portion; 211. rotary female buckle; 2111. inclined surface; 2112. rotation stopping pillar; 212. buckling slot position; 213. anti-stay pillar; 22. second attachment portion; 221. second attachment through hole; 23. second engagement body; 3. internal space; 4. wireless positioning device; 5. central axis; 6. first axis of symmetry; and 7. second axis of symmetry.

DETAILED DESCRIPTION OF THE INVENTION

The technical solutions in the embodiments of the present disclosure will be clearly and completely described below in conjunction with the accompanying drawings in the embodiments of the present disclosure. It is apparent that the embodiments described are some embodiments of the present disclosure rather than all embodiments. Based on the embodiments in the present disclosure, all other embodiments obtained by a person of ordinary skill in the art without involving any inventive effort fall within the scope of protection of the present disclosure.

The directional terms mentioned in the present disclosure, such as [upper], [lower], [front], [rear], [left], [right], [inner], [outer] and [side surface], are merely directions for with reference to the appended drawings. Therefore, the directional terms are used to illustrate and understand the present disclosure, and not used to limit the present disclosure. Furthermore, in the drawings, similar or identical structures are denoted by the same reference numerals.

Due to the features of being small in size and convenient to carry, wireless positioning devices such as Air Tag have been widely applied in the tracking of personal items, pets and children. Generally, such devices are fixed on target objects by users through key chains or ropes. However, since the devices are small in volume, additional protection housings are required to ensure firm mounting. Existing protection housings do not perform well in dealing with complicated environments, such as collision and dropping in outdoor activities, thereby resulting in the risk of falling of the devices, and affecting the user experience. Therefore, improving the robustness and impact resistance of the protection housings is essential for enhancing the stability of the devices.

To this end, an embodiment of the present disclosure provides a protection apparatus for wireless positioning device which solves the problem that an existing protection housing for a wireless positioning device has poor firmness in a complicated environment, so that there is a risk of falling of the wireless positioning device. A first base portion and a second base portion are screwed and locked with each other, and a first engagement body and a second engagement body are in aligned engagement, so that the firmness of the whole apparatus is increased, the apparatus is more steady and stable, and the structural strength is improved, thereby avoiding the risk of falling of the wireless positioning device in the face of the complicated environment.

In order to better understand the above technical solutions, a detailed description of the above technical solutions will be given below in conjunction with the accompanying drawings of specification and specific embodiments.

With reference to FIG. 1 to FIG. 11, an embodiment of the present disclosure shows a wireless positioning device 4 protection apparatus, including: a first attachment element 1, a second attachment element 2 and an internal space 3, wherein the first attachment element 1 includes a first base portion 11 and a first attachment portion 12, the first attachment portion 12 is provided at an edge of the first base portion 11, and the first attachment portion 12 is provided with a first engagement body 13; the second attachment element 2 includes a second base portion 21 and a second attachment portion 22, the second attachment portion 22 is provided at an edge of the second base portion 21, the second attachment portion 22 is provided with a second engagement body 23, and central axes 5 of both the second base portion 21 and the first base portion 11 coincide with each other; and the internal space 3 is defined and formed between the first base portion 11 and the second base portion 21 for accommodating a wireless positioning device 4; wherein the first base portion 11 and the second base portion 21 are screwed and locked with each other, and the first attachment portion 12 and the second attachment portion 22 coincide with each other, so that the first engagement body 13 and the second engagement body 23 are in aligned engagement.

Specifically, with reference to FIG. 1 to FIG. 4, the wireless positioning device 4 of this embodiment may be an Air tag, the first attachment element 1 and the second attachment element 2 constitute a protection housing of the Air tag, and the protection housing may be attached to a target object, so that the wireless positioning device 4 may acquire the positioning of the target object. Overall structures of the first attachment element 1 and the second attachment element 2 are substantially the same, and the first attachment element 1 will be described below. The first attachment element 1 is a roughly circular housing, wherein the first base portion 11 is circular, while the first attachment portion 12 is provided on an outer side of an edge of the circular first base portion 11, and with a part protruding outwards relative to the circular first base portion 11, the first attachment element 1 is not a completely circular housing but a roughly circular housing. The purpose of designing the first base portion 11 and the second base portion 21 to be circular is to fit the shape of the circular Air tag, the first base portion 11 and the second base portion 21 are coaxial about a central axis 5, the first base portion 11 and the second base portion 21 are provided up and down, and the internal space 3 is defined between the first base portion 11 and the second base portion 21 for placing the Air tag. When the first attachment element 1 and the second attachment element 2 are assembled, the Air tag is firstly placed on the first base portion 11 or the second base portion 21, the first base portion 11 and the second base portion 21 are stacked in a central direction and then screwed with each other, for example, the first base portion 11 may rotate towards the second base portion 21, the second base portion 21 may also rotate towards the first base portion 11, or the two may rotate in opposite directions, so as to complete locking, and the first base portion 11 and the second base portion 21 together wrap the Air tag in the internal space 3 to protect the Air tag. For the structure that the first attachment portion 12 and the second attachment portion 22 are attached to the target object as the first attachment element 1 and the second attachment element 2, the structural strength thereof still needs to be further improved in the face of a complicated environment. Therefore, the first engagement body 13 is provided on the first attachment portion 12, the second engagement body 23 is provided on the second attachment portion 22, and the first attachment portion 12 and the second attachment portion 22 are fastened by utilizing the engagement of the first engagement body 13 and the second engagement body 23, so that the first attachment portion 12 and the second attachment portion 22 are in steady and stable engagement, thereby further increasing the firmness of the whole apparatus, wherein an engagement mode of the first attachment portion 12 and the second attachment portion 22 is simple and convenient to operate. Specifically, when the first base portion 11 and the second base portion 21 are stacked in the central direction, the first attachment portion 12 and the second attachment portion 22 are staggered from each other, with a certain included angle between the two, and then the first attachment portion 12 and the second attachment portion 22 coincide with each other as the first base portion 11 and the second base portion 21 are screwed with each other in place, so that the first engagement body 13 and the second engagement body 23 are exactly in aligned engagement to fasten the first attachment portion 12 and the second attachment portion 22, and only screwing is needed without redundant operation, thereby being convenient and quick.

By means of this embodiment, the first attachment portion 12 and the second attachment portion 22 are fastened by utilizing the aligned engagement of the first engagement body 13 and the second engagement body 23, so that the first attachment portion 12 and the second attachment portion 22 are in steady and stable engagement. For the first attachment element 1 and the second attachment element 2, a new fixing point position is added, so that the firmness of the whole apparatus is further increased, the apparatus is more steady and stable, and the structural strength is improved, thereby being capable of avoiding the risk of falling of the wireless positioning device 4 even in the face of a complicated environment, and improving the reliability of the wireless positioning device 4.

Figure 5:
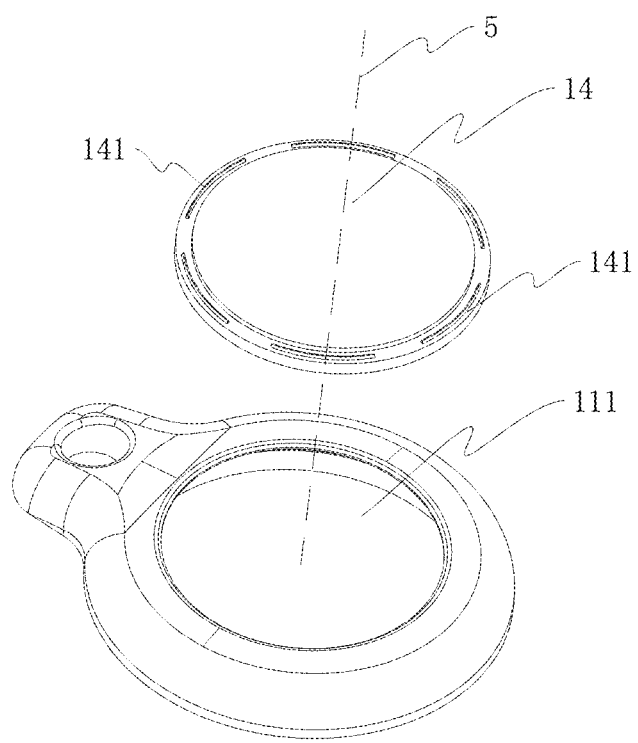
FIG. 5 shows a schematic exploded diagram of a first attachment element of the protection apparatus for wireless positioning device according to an embodiment of the present disclosure.

With reference to FIG. 5, in one embodiment, the first base portion 11 is provided with a window 111 for exposing the wireless positioning device 4, and the first attachment element 1 further includes a cover body 14 which covers the window 111. Specifically, the existing protection housing is generally designed with the window 111 to expose a part of the wireless positioning device 4, but this may result in that the device is scratched or damaged, thereby affecting the attractiveness and function thereof. To this end, In this embodiment, the first base portion 11 is provided with the window 111 for exposing the wireless positioning device 4, while the first attachment element 1 further includes a circular transparent cover body 14 designed to be capable of covering the window 111, so as to ensure that the wireless positioning device 4 may not be directly exposed to the outside. By providing the special transparent cover body 14 to cover the window 111, it not only ensures that the signal transmission of the wireless positioning device 4 is not affected, but also provides an additional physical protective layer for preventing a surface of the Air Tag from being scratched or damaged, thereby solving the problem of vulnerability in the design of the existing protection housing, and enhancing the overall durability of the device and the user experience.

In this embodiment, an edge of the cover body 14 is ultrasonically welded with the first base portion 11. Specifically, the cover body 14 and the first base portion 11 may be connected in a bonding or ultrasonic welding mode, and the ultrasonic welding mode is adopted in this embodiment. An ultrasonic welding method is adopted for fixing between the edge of the cover body 14 and the first base portion 11. This assembly mode not only improves the sealing performance between the cover body 14 and the first base portion 11, but also significantly enhances the robustness and impact resistance of the overall structure simultaneously. Ultrasonic welding is an efficient and stable connection method which can provide a stronger binding force than conventional bonding, so as to ensure that the cover body 14 may not be easily disengaged from the first base portion 11 even under extreme conditions, thereby effectively preventing the situation of accidental falling of the wireless positioning device 4 due to breakage of the housing.

With reference to FIG. 5, in a specific embodiment, central axes 5 of both the cover body 14 and the first base portion 11 coincide with each other, an edge of the cover body 14 is provided with a plurality of pairs of ultrasonic lines 141 around the central axis 5, and each pair of ultrasonic lines 141 is radially symmetric about the central axis 5. Specifically, in a manufacturing process of the wireless positioning device 4 protection apparatus, when the cover body 14 is connected to the first base portion 11 by adopting an ultrasonic welding technology, if there is no specific design, non-uniform energy distribution and a phenomenon of glue spillage may be likely to occur, thereby affecting the welding quality and the appearance of a product. To this end, in this embodiment, the cover body 14 and the first base portion 11 are coaxial about the central axis 5, the edge of the cover body 14 is provided with the plurality of pairs of ultrasonic lines 141 around the central axis 5, and each pair of ultrasonic lines 141 is radially and symmetrically distributed about the central axis 5. In this design, the ultrasonic lines 141 are utilized as energy directors or welding ribs to concentrate ultrasonic energy to a specific area, so as to achieve more precise energy application. Specifically, the ultrasonic line 141 is designed to be a protruding thin line positioned at a welding interface. These ultrasonic lines 141 are not only helpful for focusing the energy to enable vibration energy to be concentrated in a small area, but also conducive to precisely controlling a melting area, thereby reducing the risk of glue spillage. Furthermore, since each pair of ultrasonic lines 141 is radially symmetric, this ensures uniform energy distribution in a welding process, and further enhances a welding effect. By adopting the design of a plurality of pairs of ultrasonic lines 141 which are radially and symmetrically distributed for ultrasonic welding, the ultrasonic lines 141 can concentrate the ultrasonic energy in the small area, thereby effectively reducing the overall energy input required, and improving the welding efficiency. Since the energy is concentrated on the ultrasonic lines 141, a melting process mainly occurs on these lines, so as to be conducive to precisely controlling a welding area, limit the scope of melting, and significantly reduce the risk of glue spillage, thereby not only shortening the welding time and reducing the welding cost, but also reducing material spillage and improving an appearance effect of the product.

Figure 4:
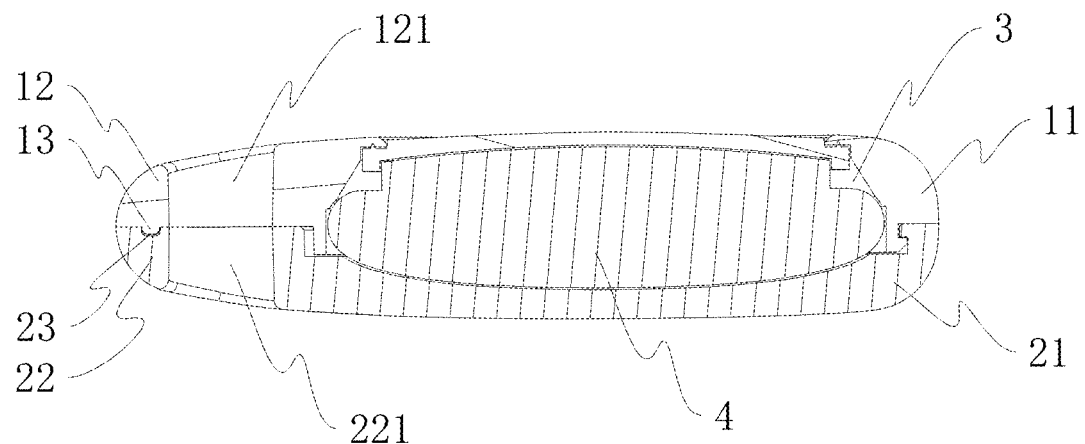
FIG. 4 shows a schematic cross-sectional diagram of the protection apparatus for wireless positioning device according to an embodiment of the present disclosure.

With reference to FIG. 4, in one embodiment, the first attachment portion 12 is provided with a first attachment through hole 121, the second attachment portion 22 is provided with a second attachment through hole 221, and the first attachment through hole 121 and the second attachment through hole 221 are in aligned coincidence. Specifically, the first attachment portion 12 and the second attachment portion 22 are respectively provided with the first attachment through hole 121 and the second attachment through hole 221, the two through holes are in aligned coincidence when being assembled to form a via hole for suspension, and the two are precisely aligned when being assembled to form a unified suspension point. The via hole allows a user to firmly suspend the wireless positioning device 4 on a backpack, pet collar or other target objects by means of a string or a key chain, and the like.

Figure 6:
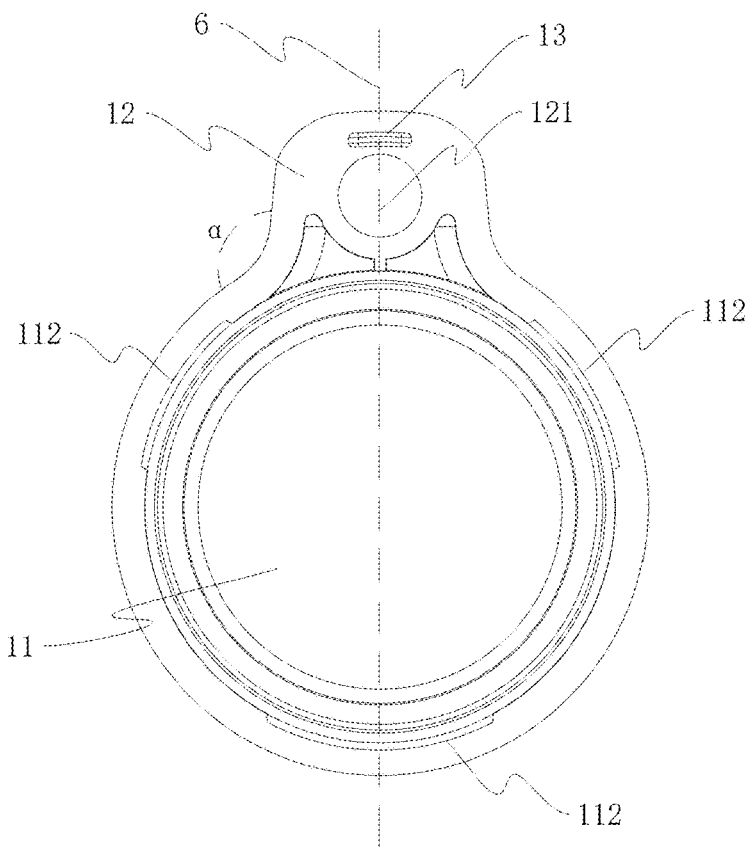
FIG. 6 shows a schematic front diagram of the first attachment element of the protection apparatus for wireless positioning device according to an embodiment of the present disclosure.

With reference to FIG. 6, in this embodiment, the first engagement body 13 is provided on one side of the first attachment through hole 121 away from the central axis 5, and the second engagement body 23 is provided on one side of the second attachment through hole 221 away from the central axis 5. Specifically, in practical applications, if the first attachment portion 12 and the second attachment portion 22 are not sufficiently reinforced at positions close to edges, a gap or "opening" state may occur, thereby affecting the stability and durability of the whole apparatus. In this embodiment, the design of positions of the engagement bodies is further optimized, namely, the first engagement body 13 is provided on one side of the first attachment through hole 121 away from the central axis 5, and the second engagement body 23 is provided on one side of the second attachment through hole 221 away from the central axis 5. This arrangement mode enables the engagement bodies are closer to the edges, thereby preventing the gap or "opening" phenomenon which may occur at the edges. By means of this embodiment, the engagement body is placed at a more outer position, so that tight connection between the first attachment portion 12 and the second attachment portion 22 can also be ensured even when being subjected to external pressure or impact, thereby improving the stability of the overall structure, enhancing the structural strength of edge parts, reducing the risk of wear or damage due to long-term use, and prolonging the service life.

Figure 7:
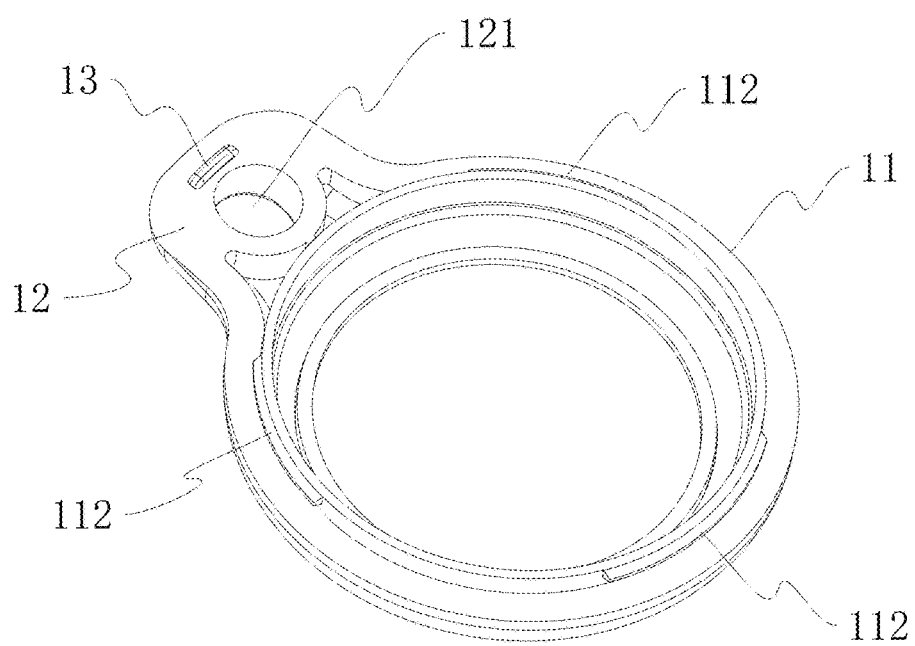
FIG. 7 shows a schematic perspective diagram of the first attachment element of the protection apparatus for wireless positioning device according to an embodiment of the present disclosure.

With reference to FIG. 7, in one embodiment, the first engagement body 13 is a positioning lug boss, the second engagement body 23 is a positioning groove, and the positioning lug boss and the positioning groove are in aligned buckling. Specifically, in order to ensure that the first attachment element 1 and the second attachment element 2 are firmly engaged after being assembled to avoid separation due to external impact or vibration, a reliable connection mechanism is required. This embodiment provides a reliable engagement structure, namely, the positioning lug boss is adopted as the first engagement body 13, the positioning groove is used as the second engagement body 23, and the two are in aligned buckling to achieve steady connection. The positioning lug boss is a strip-shaped lug boss, and the positioning groove is a strip-shaped groove. The positioning lug boss is provided on the first attachment portion 12, while the positioning groove is provided on the second attachment portion 22, and when the two components are screwed and locked, the positioning lug boss is accurately embedded into the positioning groove to form tight fit. By means of this precisely matched buckling design, not only steady connection between the first attachment portion 12 and the second attachment portion 22 is achieved, but also the impact resistance of the overall structure is also enhanced. The aligned buckling mode of the positioning lug boss and the positioning groove effectively prevents accidental separation due to external factors, and improves the safety and reliability of the device.

Figure 8:
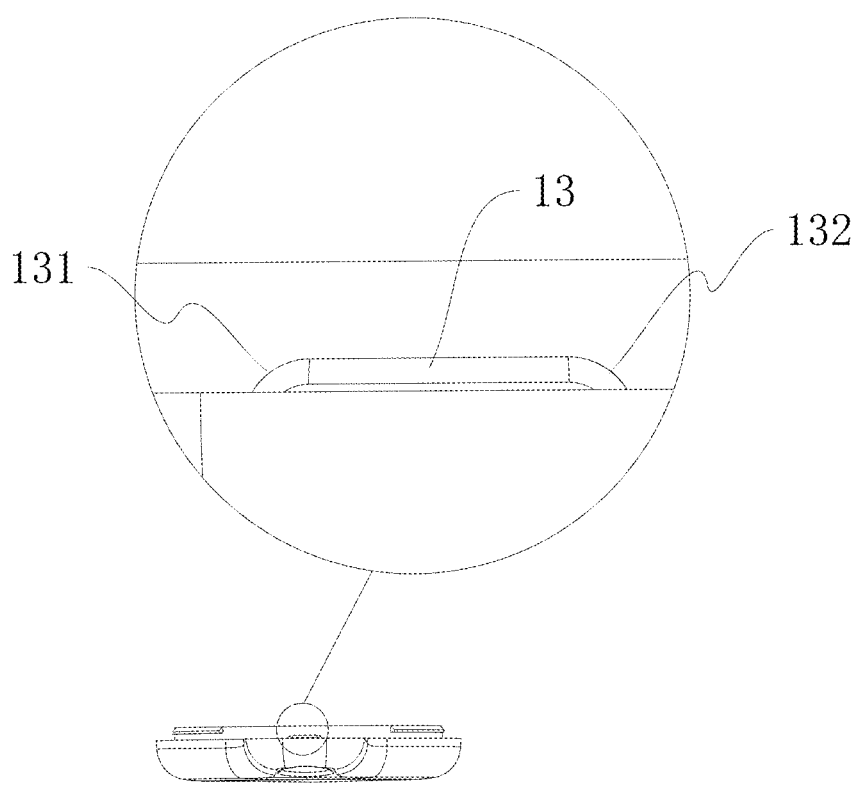
FIG. 8 shows a schematic enlarged diagram of a first engagement body of the protection apparatus for wireless positioning device according to an embodiment of the present disclosure.

With reference to FIG. 8, in this embodiment, two ends of the positioning lug boss in a screwing direction are each provided with at least one slope in a range of 20° to 90°. In an assembly process, a lack of proper guide design between the positioning lug boss and the positioning groove may result in difficulty in assembly or damage to the components. In this embodiment, the design of the positioning lug boss is further optimized, and the two ends of the positioning lug boss in the screwing direction are each provided with at least one slope. These slopes are conducive to guiding the positioning lug boss to smoothly enter the positioning groove, thereby reducing the frictional resistance and improving the assembly efficiency. The presence of the slopes enables the assembly process to be smoother, so as to reduce the risk of wear due to forced insertion, and improve the convenience in operation and the user experience simultaneously. In addition, the slopes on the two ends of the positioning lug boss may be designed as a plurality of sections, for example, the positioning lug boss is provided with two sections of slopes at one end, the positioning lug boss may be gradually guided to enter the positioning groove by different slope factors, the first section of slope which is relatively gentle reduces the resistance during initial contact, and the second section of slope which is relatively steep accelerates a final buckling process, so as to ensure smooth and efficient assembly experience, meanwhile reduce the risk of wear of the components, and improve the durability and convenience in operation.

With reference to FIG. 8, in this embodiment, one end of the positioning lug boss in a screwing-in direction is provided with a first slope 131, the other end of the positioning lug boss in a screwing-out direction is provided with a second slope 132, and the first slope 131 is smaller than the second slope 132. Specifically, in actual use, it is necessary to ensure that the positioning lug boss is both easy to assemble and less prone to accidental disengagement. This embodiment provides a differentiated slope design, namely, the positioning lug boss is provided with a smaller first slope 131 at one end in the screwing-in direction and a larger second slope 132 at the other end in the screwing-out direction. When the positioning lug boss is screwed in, it is easier for the positioning lug boss to be buckled into the positioning groove due to the smaller first slope 131, so that the assembly is smoother. When the positioning lug boss is screwed out, it is more difficult for the positioning lug boss to slip out of the positioning groove due to the larger second slope 132, thereby increasing the difficulty of disassembly, and improving the stability of the connection. By setting different slope angles, it is ensured that the positioning lug boss may be easily and smoothly buckled into the positioning groove, but faces greater resistance when a user tries to pull the positioning lug boss out in a reverse direction, thereby effectively preventing accidental disengagement and greatly enhancing the overall stability of the apparatus.

In this embodiment, the first slope 131 is in a range of 20° to 60°, the second slope 132 is in a range of 60° to 90°, and the positioning lug boss has a height in a range of 0.4-0.6 mm. Specifically, first of all, in the assembly process, the positioning lug boss needs to enter the positioning groove smoothly to achieve quick and non-destructive mounting. If the first slope 131 is too large, it will cause too much resistance during insertion and increase the difficulty of assembly; and if the first slope 131 is too small, the positioning accuracy and stability may be affected. By setting the first slope 131 to be 20° to 60°, such as 20°, 30°, 40°, 45°, 50°, 60° or other numerical values in the range, it is possible to reduce a frictional force during initial contact while ensuring that the positioning lug boss enters the positioning groove smoothly, so that the assembly process is smoother. The smaller first slope 131 is conducive to guiding the positioning lug boss to smoothly start entering the positioning groove, thereby avoiding the damage to the components caused by rigid collision, and also ensuring a sufficient guiding effect for convenience in precise alignment simultaneously. Illustratively, assuming that the first slope 131 is set to be 45°, during screwing by the user, the positioning lug boss can more easily start entering the positioning groove, thereby reducing the resistance during first contact, and providing a sufficient guiding force simultaneously to ensure that the subsequent assembly process proceeds smoothly and screwing is performed by the user more smoothly. Secondly, in order to prevent the positioning lug boss from being easily disengaged out of the positioning groove, it is necessary to design a proper slope to increase the difficulty of reverse pull-out, thereby improving the safety and stability of the connection. By setting the second slope 132 to be 60° to 90°, such as 70°, 80°, 90° or other numerical values in the range, the difficulty of pulling the positioning lug boss out of the positioning groove may be significantly increased, and a stronger locking effect may be provided. The larger slope angle increases the frictional force and resistance during reverse pull-out, thereby effectively preventing the occurrence of the situation of accidental disengagement, and enhancing the firmness and reliability of the overall structure. Illustratively, if the second slope 132 is set to be 80°, the positioning lug boss is also not likely to slip out of the positioning groove even when being subjected to the effect of an external force, thereby greatly improving the stability and safety of the apparatus in a complicated environment, and being suitable for application scenarios such as outdoor activities. Again, a height of the positioning lug boss directly affects the tightness of the fit with the positioning groove, an insufficient height may result in loose fit, while an excessive height may cause the difficulty of assembly or damage to the components. By controlling the height of the positioning lug boss to be 0.4-0.6 mm, not only a sufficient embedding depth can be ensured to maintain steady connection, but also assembly obstacles or unnecessary wear due to the excessive height can be avoided. This design balances the assembly convenience and connection strength, and improves the durability of the apparatus and the user experience. Illustratively, the height of the positioning lug boss is taken to be 0.5 mm, and in actual use, such a height not only enables the positioning lug boss to form good embedding with the positioning groove, but also cannot cause the difficulty of assembly or excessive friction between parts due to the height problem, thereby ensuring the reliability and stability in long-term use.

With reference to FIG. 6, in this embodiment, a center of the first attachment through hole 121 and a center of the first base portion 11 define a first axis of symmetry 6 about which the positioning lug boss is symmetric; and a center of the second attachment through hole 221 and a center of the second base portion 21 define a second axis of symmetry 7 about which the positioning groove is symmetric. Specifically, in order to ensure that the positioning lug boss and the positioning groove can be precisely aligned in the assembly process, and avoid the difficulty of assembly or unstable connection due to minor deviations, a reliable alignment mechanism is required. In this embodiment, a mode based on the axis of symmetry is adopted, namely, the center of the first attachment through hole 121 and the center of the first base portion 11 define the first axis of symmetry 6, and the center of the second attachment through hole 221 and the center of the second base portion 21 define the second axis of symmetry 7. The positioning lug boss is provided symmetrically about the first axis of symmetry 6, and the positioning groove is provided symmetrically about the second axis of symmetry 7. When the two attachment elements are screwed and locked, the positioning lug boss can be accurately embedded into the positioning groove to achieve precise alignment. Specifically, the presence of the first axis of symmetry 6 and the second axis of symmetry 7 provides a clear basis reference for the positioning lug boss and the positioning groove, so that the two always maintain a consistent positional relationship in the assembly process. Whether in an initial contact stage or a final locking stage, this symmetric design can effectively reduce the assembly errors, improve the connection accuracy, and achieve seamless abutment, thereby improving the reliability and durability of the whole apparatus.

With reference to FIG. 6 and FIG. 7, in one embodiment, an inner side of the edge of the second base portion 21 is provided with a plurality of rotary female buckles 211, and the plurality of rotary female buckles 211 are in equidistant radiation distribution around the central axis 5; an inner side of the edge of the first base portion 11 is provided with a plurality of rotary male buckles 112, and the plurality of rotary male buckles 112 are in equidistant radiation distribution around the central axis 5; wherein the rotary male buckles 112 are rotatably buckled with the rotary female buckles 211. Specifically, in order to ensure that the first base portion 11 and the second base portion 21 can achieve steady and easy-to-operate connection during assembly, a reliable mechanical locking structure is required, and a conventional connection mode may have the problems that the assembly is difficult, unfirm or easy to loosen. In this embodiment, the inner side of the edge of the second base portion 21 is provided with the plurality of rotary female buckles 211, and these rotary female buckles 211 are in equidistant radiation distribution around the central axis 5; while the inner side of the edge of the first base portion 11 is provided with the plurality of rotary male buckles 112, and these rotary male buckles 112 are also in equidistant radiation distribution around the central axis 5. A ring body may be provided on the first base portion 11, and the plurality of rotary male buckles 112 are provided on a side wall of the ring body, so as to facilitate the aligned assembly of the rotary male buckles 112. During assembly, the rotary male buckles 112 and the rotary female buckles 211 are tightly connected by means of rotatably buckling to form a robust overall structure. The design of the rotary male buckles 112 and the rotary female buckles 211 enables the assembly process to become simple and intuitive, and the rotary male buckles 112 may sequentially enter the corresponding rotary female buckles 211 to complete the buckling only by stacking the two base portions and starting to screw, wherein the rotary male buckles 112 and the rotary female buckles 211 are of inverted buckling structures, both of them are strip-shaped, and after the screwing is in place, the rotary male buckles 112 and the rotary female buckles 211 are of the inverted buckling structures, namely, are buckled up and down, so that the internal space 3 is closed by the first base portion 11 and the second base portion 21, and the first base portion 11 and the second base portion 21 cannot be opened up and down, so as to lock the first base portion 11 and the second base portion 21. Moreover, the design in which the plurality of rotary male buckles 112 and the plurality of rotary female buckles 211 are in equidistant radiation distribution around the central axis 5 may form a plurality of buckling points, so that the structure is more steady and stable, and the structural strength is high. By means of the design of precise fit between the rotary female buckles 211 and the rotary male buckles 112 in this embodiment, the high efficiency and stability in the assembly process are achieved, not only the assembly is convenient and quick, but also the impact resistance and durability of the whole apparatus are greatly enhanced, so that the reliable protection of the wireless positioning device 4 in various environments is ensured.

Figure 10:
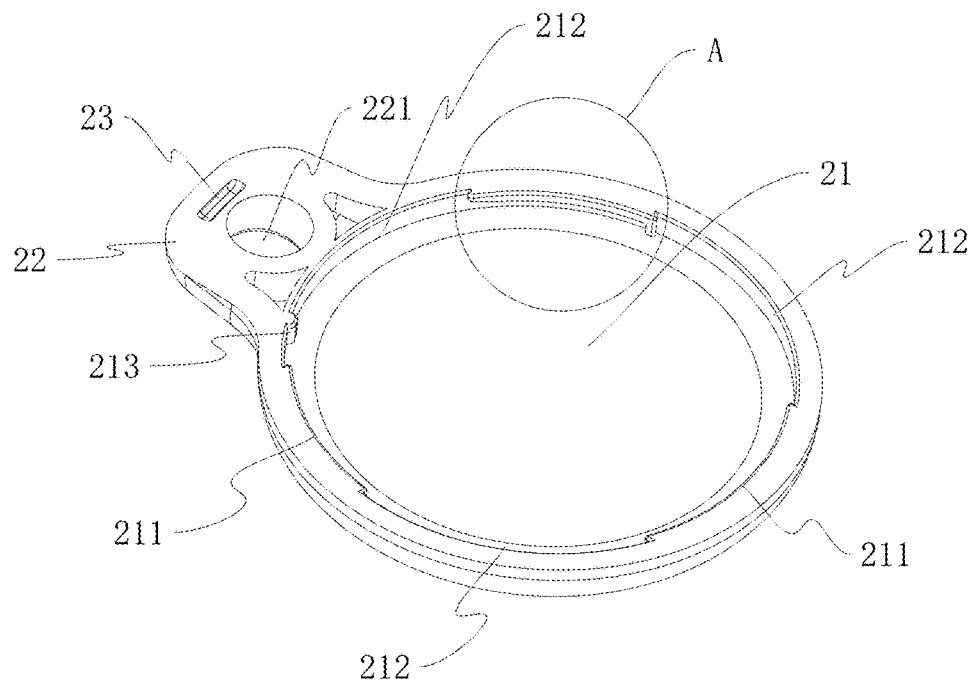
FIG. 10 shows a schematic perspective diagram of the second attachment element of the protection apparatus for wireless positioning device according to an embodiment of the present disclosure.
Figure 11:
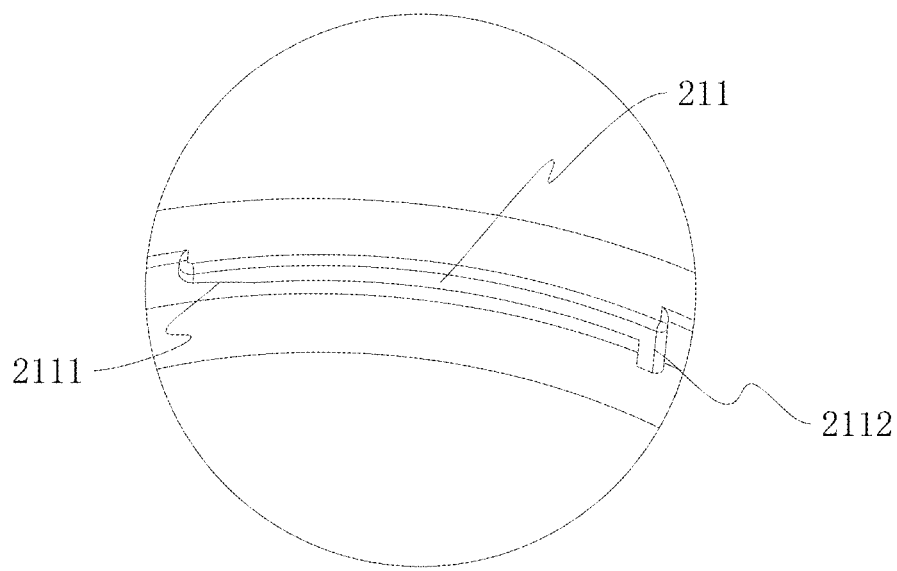
FIG. 11 shows an enlarged diagram of a portion A of FIG. 10.

With reference to FIG. 10 and FIG. 11, in this embodiment, one end of the rotary female buckle 211 in the screwing-in direction is provided with an inclined surface 2111, and the other end of the rotary female buckle 211 is provided with a rotation stopping pillar 2112. Specifically, the screwing-in direction may be a clockwise direction, and the screwing-out direction may be a counterclockwise direction. Of course, it should be understood that the screwing-in direction may be the counterclockwise direction, and the screwing-out direction may be the clockwise direction. At two ends of the rotary female buckle 211, one end is provided with the inclined surface 2111, and the other end is provided with the rotation stopping pillar 2112. The design of the inclined surface 2111 is conducive to guiding the rotary male buckle 112 to smoothly enter the rotary female buckle 211, thereby reducing a frictional force during initial contact, and enabling the assembly process to be smoother. The inclined surface 2111 generally has a smaller angle, which enables the rotary male buckle 112 to be inserted more easily when starting to enter the rotary female buckle 211, thereby reducing the resistance during first contact. As the rotary male buckle 112 gradually penetrates into the rotary female buckle 211, the inclined surface 2111 provides a good guiding effect, so as to ensure that the rotary male buckle 112 accurately enters a predetermined position. Once the rotary male buckle 112 reaches the correct position, the rotation stopping pillar 2112 may play a role, and the rotation stopping pillar 2112 is used for preventing the over-rotation of the rotary male buckle 112. When the rotary male buckle 112 reaches the correct position, the rotation stopping pillar 2112 may bear against the rotary male buckle 112 to prevent the rotary male buckle 112 from continuing to rotate, and a rotating action is prevented, so as to avoid the occurrence of the situation that the positioning lug boss slips out of the positioning groove due to an excessive rotating force, thereby ensuring the precise alignment between the positioning lug boss and the positioning groove. By providing the inclined surface 2111 and the rotation stopping pillar 2112, the high efficiency and stability in the assembly process are achieved. The inclined surface 2111 reduces the frictional resistance at an initial stage of assembly, so that the user may complete the initial abutment more easily, and the convenience in operation is improved. The rotation stopping pillar 2112 ensures that the rotary male buckle 112 may not be disengaged from an optimal alignment point due to over-rotation, thereby effectively maintaining tight fit between the positioning lug boss and the positioning groove.

Figure 9:
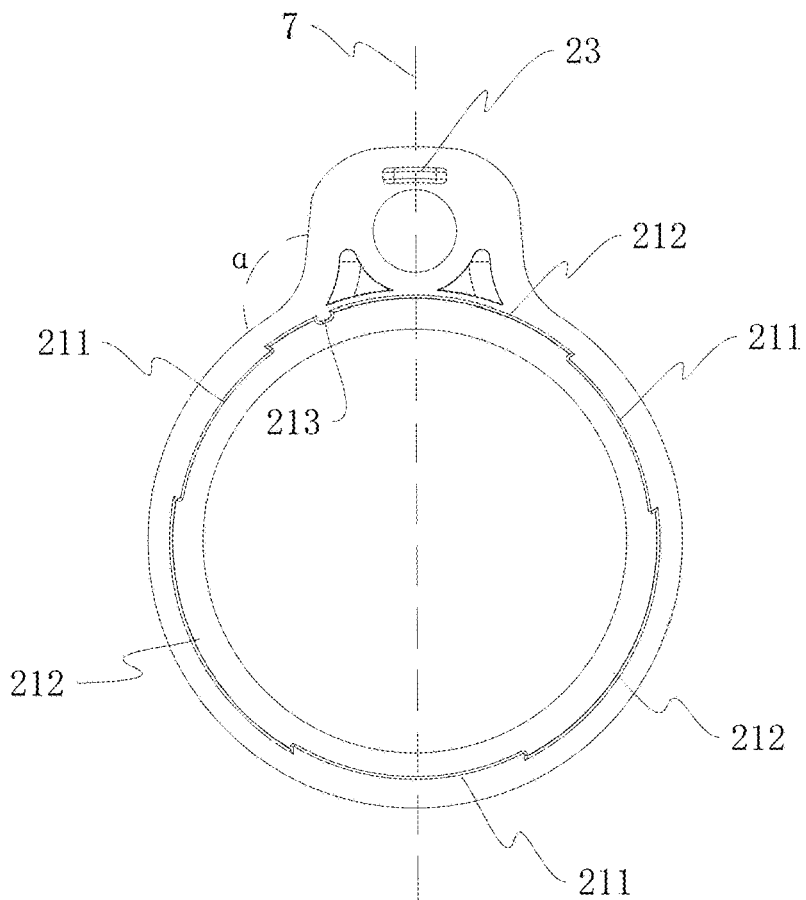
FIG. 9 shows a schematic front diagram of a second attachment element of the protection apparatus for wireless positioning device according to an embodiment of the present disclosure.

With reference to FIG. 9 and FIG. 10, in this embodiment, a buckling slot position 212 is formed between every two adjacent rotary female buckles 211, and the buckling slot position 212 is a position where the rotary male buckle 112 is initially placed. Specifically, in order to ensure that the rotary male buckle 112 can accurately enter the rotary female buckle 211, an effective guiding mode is required to assist the user in initial placement. The buckling slot position 212 is formed between every two adjacent rotary female buckles 211, and these buckling slot positions 212 provide initial placement positions for the rotary male buckles 112. The buckling slot position 212 provides a clear reference point to help the user quickly find the correct assembly position, thereby giving the user quick assembly guidance and reducing errors in the assembly process. Before screwing, the first base portion 11 and the second base portion 21 are stacked, each rotary male buckle 112 is placed at the corresponding buckling slot position 212, the buckling slot position 212 is the initial placement position of the rotary male buckle 112, and as the first base portion 11 and the second base portion 21 are screwed with each other, the rotary male buckle 112 leaves the buckling slot position 212 and enters the rotary female buckle 211 to be buckled with the rotary female buckle 211. By introducing the buckling slot position 212 as the initial placement position of the rotary male buckle 112, not only the operation efficiency is improved, but also the accuracy of assembly is enhanced, thereby ensuring the stability and reliability of final connection.

With reference to FIG. 9, in this embodiment, one of the buckling slot positions 212 abuts the second attachment portion 22, and an anti-stay pillar 213 for preventing placement of the rotary male buckle 112 is provided at the buckling slot position 212 abutting the second attachment portion 22. Specifically, in actual use, if the user incorrectly places the rotary male buckle 112 at an incorrect position, assembly failure or damage to the components may be caused. To this end, in this embodiment, the anti-stay pillar 213 is added, one of the buckling slot positions 212 abuts the second attachment portion 22, and the anti-stay pillar 213 for preventing the placement of the rotary male buckle 112 is provided at the buckling slot position 212. When the user incorrectly places the rotary male buckle 112, the anti-stay pillar 213 may block the rotary male buckle 112, so that the rotary male buckle 112 cannot be placed, the user is guided to adjust the rotary male buckle 112 to be placed at the correct position. The presence of the anti-stay pillar 213 may effectively prevent the user from incorrectly placing the rotary male buckle 112 at this position, thereby avoiding assembly errors. By providing the anti-stay pillar 213, the occurrence of wrong assembly is effectively prevented, the success rate and reliability of assembly are improved, and it is ensured that the user may not inadvertently cause assembly failure or damage to the components during assembly.

In one embodiment, the first base portion 11 and the second base portion 21 are both radially symmetric about the central axes 5. Specifically, the first base portion 11 and the second base portion 21 are both in a circular shape or other geometric shapes having radial symmetry.

In one embodiment, the first attachment portion 12 and the second attachment portion 22 are respectively formed by radially protruding the edges of the first base portion 11 and the second base portion 21 towards a direction away from the central axes 5. Specifically, since the first base portion 11 and the second base portion 21 are mainly used for forming the internal space 3 to accommodate the Air Tag, there is a lack of sufficient surface area to provide an attachment structure. The first attachment portion 12 and the second attachment portion 22 in this embodiment radially protrude, so as to provide a sufficient mounting position for the attachment structure (such as the attachment through hole for suspension described above) without affecting the use of the internal space 3. Specifically, the first attachment portion 12 and the second attachment portion 22 extend outwards from the edges of the base portions to form additional platforms or areas specially used for providing the attachment structures and the engagement bodies, so as to ensure that these attachment structures and engagement bodies do not interfere with the internally placed Air Tag. By forming the first attachment portion 12 and the second attachment portion 22 by radial protrusion, the contradiction between the internal space 3 and an external attachment demand is effectively solved, thereby not only providing a necessary space for the attachment structure, and ensuring that the device may be firmly fixed on the target object, but also simplifying the overall structural layout, and improving the convenience and stability of assembly. The attachment structure is tactfully arranged on a protruding part at the edge of the base portion, which does not affect the safe placement of the internal Air Tag, and also enhances the reliability of the external connection.

With reference to FIG. 6 and FIG. 9, in this embodiment, an included angle α is formed at a position where the first base portion 11 is joined with and transitioned to the first attachment portion 12, and the included angle α is in a range of 120° to 130°. Specifically, in an assembly process of the wireless positioning device 4 protection apparatus, the user needs a position convenient for force application to push the first attachment portion 12 to be subjected to screwing operation. If the position where the first base portion 11 is joined with and transitioned to the first attachment portion 12 is too straight, there is a lack of effective acting point, thereby resulting in inconvenience in operation. In this embodiment, the included angle α is formed at the position where the first base portion 11 is joined with and transitioned to the first attachment portion 12, and the included angle α is in the range of 120° to 130°. This design enables the first attachment portion 12 which protrudes outwards to have a certain degree of curvature at the position where the first base portion 11 is joined with and transitioned to the first attachment portion 12, so as to form a blocking surface in a rotating direction, thereby facilitating the application of a pushing force by the user's finger. Specifically, this included angle α not only provides a sufficient space for the placement of the user's finger, but also ensures comfort and stability during operation. It should be noted that a structure of the second attachment portion 22 is the same as a structure of the first attachment portion 12, and an included angle α at a position where the second attachment portion 22 is joined with and transitioned to the second base portion 21 is also in a range of 120° to 130°. By setting the included angle α in a specific range, the operation experience of the user is significantly improved, thereby not only providing a clear and comfortable acting point for the user, but also enhancing the stability and controllability in the screwing process. For example, in actual use, the user may easily place the finger on the area of the included angle α, and smoothly and efficiently complete screwing operation by utilizing the support and guidance provided by this area, thereby improving the assembly efficiency and the user experience.

In this embodiment, edge surfaces of the first attachment portion 12 and the second attachment portion 22 are cambered surfaces. Specifically, when the user applies the pushing force to the first attachment portion 12 or the second attachment portion 22, if the edge surface is relatively sharp, it may cause larger stress to be concentrated on the finger, thereby causing discomfort. To this end, in this embodiment, the edge surfaces of the first attachment portion 12 and the second attachment portion 22 are designed as the cambered surfaces having larger contact areas, so that the cambered surfaces can effectively disperse the pressure applied to the finger, reduce the phenomenon of stress concentration, and provide more comfortable sense of touch. Specifically, the design of the cambered surfaces enables the contact surface of the finger to be smoother, thereby reducing the local intensity of pressure, reducing pressure points when the finger is stressed, avoiding the discomfort or marks on the finger caused by excessive pressure, and improving the convenience and comfort in operation.

In this embodiment, a proportion of a width of the first attachment portion 12 occupying a perimeter of the first base portion 11 is in a range of 7% to 20%. Specifically, the first attachment portion 12 needs to be wide enough to provide the attachment structure and the engagement body, but an excessive width may increase the material utilization amount and weight, thereby affecting the portability and cost effectiveness, and an insufficient width cannot meet functional requirements. Therefore, in this embodiment, after verification, the proportion of the width of the first attachment portion 12 occupying the perimeter of the first base portion 11 is in the range of 7% to 20%. This proportion range not only ensures a sufficient space for providing the attachment structure and the engagement body, but also avoids unnecessary material waste and weight increase. It should be noted that a structure of the second attachment portion 22 is the same as a structure of the first attachment portion 12, and a proportion of a width of the second attachment portion 22 occupying a perimeter of the second base portion 21 is also in the range of 7% to 20%. By precisely controlling the width proportion of the first attachment portion 12, an optimal balance between functions and material usage is achieved, which not only ensures that the first attachment portion 12 has a sufficient space to mount the necessary attachment structure and engagement body, but also effectively controls the material utilization amount and weight, and improving the portability and cost effectiveness of a product.

The above description is merely specific embodiments of the present disclosure, but the scope of protection of the present disclosure is not limited thereto. Any person skilled in the art may readily conceive of various equivalent modifications or substitutions within the technical scope disclosed in the present disclosure, and these modifications or substitutions should be covered in the scope of protection of the present disclosure. Therefore, the scope of protection of the present disclosure should be determined by the scope of protection of the claims.

The invention claimed is:
1. A protection apparatus for wireless positioning device, comprising:
    a first attachment element comprising a first base portion and a first attachment portion, the first attachment portion being provided at an edge of the first base portion, and the first attachment portion being provided with a first engagement body;
    a second attachment element comprising a second base portion and a second attachment portion, the second attachment portion being provided at an edge of the second base portion, the second attachment portion being provided with a second engagement body, and central axes of both the second base portion and the first base portion coinciding with each other; and an internal space defined and formed between the first base portion and the second base portion for accommodating a wireless positioning device;

wherein the first base portion and the second base portion are screwed and locked with each other, and the first attachment portion and the second attachment portion coincide with each other, so that the first engagement body and the second engagement body are in aligned engagement;

wherein an inner side of the edge of the second base portion is provided with a plurality of rotary female buckles, and the plurality of rotary female buckles are in equidistant radiation distribution around the central axis; an inner side of the edge of the first base portion is provided with a plurality of rotary male buckles, and the plurality of rotary male buckles are in equidistant radiation distribution around the central axis; wherein the rotary male buckles are configured to be rotatably buckled with the rotary female buckles;

wherein one end of the rotary female buckle in the screwing-in direction is provided with an inclined surface, and the other end of the rotary female buckle is provided with a rotation stopping pillar;

wherein a buckling slot position is formed between every two adjacent rotary female buckles, and the buckling slot position is a position where the rotary male buckle is initially placed; wherein after each rotary male buckle is initially placed in the corresponding buckling position, the first base portion and the second base portion are operative to be rotated relative to each other to a position in which each rotary male buckle is positioned substantially aligned with the corresponding rotary female buckle and in which the first engagement body is substantially aligned with the second engagement body, so that each rotary male buckle is interlocked with the corresponding rotary female buckle thus interlocking the first base portion with the second base portion.

2. The protection apparatus for wireless positioning device according to claim 1, wherein the first base portion is provided with a window for exposing the wireless positioning device, and the first attachment element further comprises a cover body which covers the window.

3. The protection apparatus for wireless positioning device according to claim 2, wherein an edge of the cover body is ultrasonically welded with the first base portion.

4. The protection apparatus for wireless positioning device according to claim 2, wherein central axes of both the cover body and the first base portion coincide with each other, an edge of the cover body is provided with a plurality of pairs of ultrasonic lines around the central axis, and each pair of ultrasonic lines is radially symmetric about the central axis.

5. The protection apparatus for wireless positioning device according to claim 1, wherein the first attachment portion is provided with a first attachment through hole, the second attachment portion is provided with a second attachment through hole, and the first attachment through hole and the second attachment through hole are in aligned coincidence.

6. The protection apparatus for wireless positioning device according to claim 5, wherein the first engagement body is provided on one side of the first attachment through hole away from the central axis, and the second engagement body is provided on one side of the second attachment through hole away from the central axis.

7. The protection apparatus for wireless positioning device according to claim 1, wherein the first engagement body is a positioning lug boss, the second engagement body is a positioning groove, and the positioning lug boss and the positioning groove are in aligned buckling.

8. The protection apparatus for wireless positioning device according to claim 7, wherein two ends of the positioning lug boss in a screwing direction are each provided with at least one slope in a range of 20° to 90°.

9. The protection apparatus for wireless positioning device according to claim 7, wherein one end of the positioning lug boss in a screwing-in direction is provided with a first slope, the other end of the positioning lug boss in a screwing-out direction is provided with a second slope, and the first slope is smaller than the second slope.

10. The protection apparatus for wireless positioning device according to claim 9, wherein the first slope is in a range of 20° to 60°, the second slope is in a range of 60° to 90°, and the positioning lug boss has a height in a range of 0.4-0.6 mm.

11. The protection apparatus for wireless positioning device according to claim 7, wherein a center of the first attachment through hole and a center of the first base portion define a first axis of symmetry about which the positioning lug boss is symmetric; and a center of the second attachment through hole and a center of the second base portion define a second axis of symmetry about which the positioning groove is symmetric.

12. The protection apparatus for wireless positioning device according to claim 1, wherein one of the buckling slot positions abuts the second attachment portion, and an anti-stay pillar for preventing placement of the rotary male buckle is provided at the buckling slot position abutting the second attachment portion.

13. The protection apparatus for wireless positioning device according to claim 1, wherein the first base portion and the second base portion are both radially symmetric about the central axes.

14. The protection apparatus for wireless positioning device according to claim 1, wherein the first attachment portion and the second attachment portion are respectively formed by radially protruding the edges of the first base portion and the second base portion towards a direction away from the central axes.

15. The protection apparatus for wireless positioning device according to claim 14, wherein an included angle is formed at a position where the first base portion is joined with and transitioned to the first attachment portion, and the included angle is in a range of 120° to 130°.

16. The protection apparatus for wireless positioning device according to claim 14, wherein edge surfaces of the first attachment portion and the second attachment portion are cambered surfaces.

17. The protection apparatus for wireless positioning device according to claim 14, wherein a proportion of a width of the first attachment portion occupying a perimeter of the first base portion is in a range of 7% to 20%.

* * * * *